United States Patent
Whitehurst et al.

(10) Patent No.: US 8,734,887 B2
(45) Date of Patent: May 27, 2014

(54) AQUEOUS DOUGH CONDITIONING COMPOSITION

(75) Inventors: Robert Whitehurst, Horton (GB); Matthew Green, Bucks (GB)

(73) Assignee: Cereform Limited, Northampton (GB)

( * ) Notice: Subject to any disclaimer, the term of this patent is extended or adjusted under 35 U.S.C. 154(b) by 113 days.

(21) Appl. No.: 12/520,298

(22) PCT Filed: Dec. 21, 2007

(86) PCT No.: PCT/GB2007/005005
§ 371 (c)(1),
(2), (4) Date: Oct. 19, 2009

(87) PCT Pub. No.: WO2008/078107
PCT Pub. Date: Jul. 3, 2008

(65) Prior Publication Data
US 2010/0028491 A1 Feb. 4, 2010

(30) Foreign Application Priority Data
Dec. 22, 2006 (GB) .................................. 0625743.0

(51) Int. Cl.
*A21D 2/00* (2006.01)
*A21D 10/00* (2006.01)
*A23L 1/105* (2006.01)

(52) U.S. Cl.
CPC .............. *A21D 10/00* (2013.01); *A21D 10/002* (2013.01); *A23L 1/105* (2013.01)
USPC ......................................... 426/653; 426/496

(58) Field of Classification Search
CPC ........................................................ A21D 10/00
USPC .................................................. 426/496, 653
See application file for complete search history.

(56) References Cited

U.S. PATENT DOCUMENTS 3,064,010 A * 11/1962 Huffman ....................... 549/315
3,701,668 A * 10/1972 Morse et al. .................. 426/653
2007/0292562 A1  12/2007 Green et al.

FOREIGN PATENT DOCUMENTS

| EP | 1472930 | 11/2004 |
|---|---|---|
| EP | 1547467 A1 * | 6/2005 |
| GB | 2402317 A * | 12/2004 |

(Continued)

OTHER PUBLICATIONS

Naka T. et al. 2005. Modulation of Branching Morphogenesis of Fetal Mouse Submandibular Gland by Sodium Ascorbate and Epigallocatechin Gallate. In Vivo: 19: 883-888. [Online] Retrieved from Internet: <http://iv.iiarjournals.org/content/19/5/883.full.pdf>.*

(Continued)

*Primary Examiner* — Jyoti Chawla
(74) *Attorney, Agent, or Firm* — MacMillan, Sobanski & Todd, LLC

(57) ABSTRACT

An aqueous dough conditioning composition comprises water, one or more enzymes, salt and sugar characterized in that the composition in substantially free of antioxidant. Preferably, the composition comprises less than 0.05% by wt of antioxidant. The composition may further comprise an oxidant and/or a hydrocolloid. The invention also provides dough comprising the aqueous conditioning composition, and baked products made therefrom. There is also provided the use of salt and sugar to stabilize an aqueous dough conditioning composition comprising one or more enzymes, the composition being substantially free of antioxidant.

17 Claims, 1 Drawing Sheet

| Cereform | Test Bake Report | | | | | | | |
|---|---|---|---|---|---|---|---|---|
| Test date | 11th June 2005 | | | | | | | |
| Test | Aqueous Conditioner Project | | | | | | | |
| Objectives | Final Test base on trial products 3/3/05 test bake of Aqueous Conditioner. Production Trial 4 w/o Sulphur Dioxide | | | | | | | |
| Bread type | 4 piece lidded | | | | | | | |
| Base recipe: | | | | | | | | |
| Wheat Flour | 3000 | 3000 | 3000 | 3000 | | | | |
| Salt | 60 | 60 | 60 | 60 | | | | |
| Yeast | 75 | 75 | 75 | 75 | | | | |
| Water | 1830 | 1830 | 1830 | 1830 | | | | |
| Datem | 9 | 9 | 9 | 9 | | | | |
| Additions: | | | | | | | | |
| Dough number | 1 | 2 | 3 | 4 | 5 | 6 | 7 | 8 |
| Powder control | 6 | | | | | | | |
| Aqueous Conditioner 0.2% Fluid Room temp. | | 6 | | | | | | |
| Aqueous Conditioner 0.2% Fluid Fridge 5C | | | 6 | | | | | |
| Aqueous Conditioner 0.2% Fluid Incubator 35C | | | | 6 | | | | |
| Processing: | | | | | | | | |
| Mixer | High speed | | | | | | | |
| Mix time mins | | | | | | | | |
| Energy wh/kg | 11 watt/hours | | | | | | | |
| Vacuum | 60 sec delay | | | | | | | |
| Scaling weight g | 900g | | | | | | | |
| Comments and conclusions | All products found to be acceptable at the end of shelf life. With only a little deterioration. QA department and Technical Manager considered product to be acceptable. | | | | | | | |
| Technologist | M Green | | | | | | | |
| Date | 10/06/2005 | | | | | | | |

(56) References Cited

FOREIGN PATENT DOCUMENTS

| WO | WO9613980 | 5/1996 |
| WO | WO0226044 | 4/2002 |
| WO | WO2004105494 | 12/2004 |

OTHER PUBLICATIONS

PCT International Search Report dated May 13, 2008, PCT/GB2007/005005 filed Dec. 21, 2007.

* cited by examiner

| Cereform | Test Bake Report | | | | | | | |
|---|---|---|---|---|---|---|---|---|
| Test date | 11th June 2005 | | | | | | | |
| Test | Aqueous Conditioner Project | | | | | | | |
| Objectives | Final Test base on trial products 3/3/05 test bake of Aqueous Conditioner. Production Trial 4 w/o Sulphur Dioxide | | | | | | | |
| Bread type | 4 piece lidded | | | | | | | |
| Base recipe: | | | | | | | | |
| Wheat Flour | 3000 | 3000 | 3000 | 3000 | 3000 | | | |
| Salt | 60 | 60 | 60 | 60 | 60 | | | |
| Yeast | 75 | 75 | 75 | 75 | 75 | | | |
| Water | 1830 | 1830 | 1830 | 1830 | 1830 | | | |
| Datem | 9 | 9 | 9 | 9 | 9 | | | |
| Additions: | | | | | | | | |
| Dough number | 1 | 2 | 3 | 4 | 5 | 6 | 7 | 8 |
| Powder control | 6 | | | | | | | |
| Aqueous Conditioner 0.2% Fluid Room temp. | | 6 | | | | | | |
| Aqueous Conditioner 0.2% Fluid Fridge 5C | | | 6 | | | | | |
| Aqueous Conditioner 0.2% Fluid Incubator 35C | | | | 6 | | | | |
| Processing: | | | | | | | | |
| Mixer | High speed | | | | | | | |
| Mix time mins | | | | | | | | |
| Energy wh/kg | 11 watt/hours | | | | | | | |
| Vacuum | 60 sec delay | | | | | | | |
| Scaling weight g | 900g | | | | | | | |
| Comments and conclusions | All products found to be acceptable at the end of shelf life. With only a little deterioration. QA department and Technical Manager considered product to be acceptable. | | | | | | | |
| Technologist | M Green | | | | | | | |
| Date | 10/06/2005 | | | | | | | |

AQUEOUS DOUGH CONDITIONING COMPOSITION

The present invention claims the benefit of the PCT/GB2007/005005 filed Dec. 20, 2007, which claims priority to GB Ser. No. 0625743.0 filed Dec. 21, 2006.

The present invention relates to an aqueous dough conditioning composition and to a process for its preparation, and also to a process for making dough using the composition, and to a process for preparing baked products from such a dough.

Dough conditioners (i.e. bread improvers) typically used in the preparation of baked dough products are generally provided in a dry form (e.g. powder or tablet form) or as an emulsifier based liquid composition comprising a lipid carrier. See, for example, U.S. Pat. No. 3,934,040 which describes an additive composition for dough. Reference may also be made to U.S. Pat. No. 3,595,671, U.S. Pat. No. 6,251,444 and US 2004/0076716. A problem associated with both these forms of dough conditioner is that they are relatively difficult to pump and dose which, in turn, complicates their use in the mass production of dough and baked dough products. Furthermore, dry forms of dough conditioner can result in a dusting effect which can cause allergic reactions. Also, oil based conditioners undesirably increase the fat content of a product and, additionally, the emulsifier content tends to thicken the fluid, cause instability at temperatures above 35° C., and result in excessive viscosity at temperatures below 10° C. WO 02/060262 describes a bread conditioner comprising isolated soy protein and xylanase.

Aqueous compositions are perhaps a preferred form of dough conditioner inasmuch as their carrier (water) is inexpensive, low fat and results in a non-dusting product. Aqueous solutions of dough conditioner may also be readily pumped and dosed allowing for a convenient mass production of dough products. However, aqueous solutions or suspensions of a dough conditioner suffer from stability problems owing to denaturation/decomposition of the enzyme systems and ascorbic acid (used as an oxidant) commonly used as the active ingredients. This instability also tends to increase with ambient temperature. Due to minimum shelf life requirements, use of aqueous compositions of dough conditioners has not in the past been practical. Nevertheless, in WO 02/26044 A2, a liquid bread improving composition comprising one or more polyols in an aqueous solution is disclosed. The polyols lower water activity to such an extent that the processes which inactivate enzymes and degrade ascorbic acid and microbial infections are slowed. As a result, the shelf life of the composition is increased. WO 03/039261 describes an example of a "water-free" viscous liquid bread improver.

Aqueous-based compositions are also described in WO 96/13980 and WO 04/105494. However, these compositions require the use of an antioxidant as an essential ingredient, and this is preferably sodium metabisulphite or an equivalent sulphur containing compound.

Whilst the use of an antioxidant has hitherto been thought essential in order to adequately stabilise the aqueous composition, there have more recently been health concerns about the use of sulphites in dough products, particularly bread.

After further research, we have now found a way of formulating an aqueous composition without the need for antioxidants, whilst still providing compositions of excellent stability.

Accordingly, in its broadest aspect, the present invention provides an aqueous dough conditioning composition comprising water, one or more enzymes, salt and sugar characterised in that the composition is substantially free of antioxidant.

In particular, the composition is substantially free of water-soluble antioxidants such as sulphur dioxide or compounds which generate sulphur dioxide or sulphites. More particularly, the composition is substantially free of metabisulphites, especially sodium metabisulphite.

Preferably, the composition is completely free of antioxidant, especially completely free of those antioxidants described above.

Substantially free of antioxidant should be understood to mean that the composition contains no significant or appreciable levels of antioxidant, in contrast to the levels used heretofore in dough conditioning or bread improver compositions. For example, our International Application Number PCT/GB2004/002323 (published as WO2004/105494) describes sodium metabisulphite levels of between 0.1% and 1% by weight of the liquid conditioning composition. In the present invention, the level of antioxidant is preferably significantly below this, for example below 0.05% by weight, preferably below 0.01% by weight, of the aqueous composition. More preferably, the composition is free of even trace amounts of antioxidant, or components that may exert an antioxidant effect.

We have found that, quite surprisingly, in contradistinction to the teachings of the prior art, it is in fact possible to formulate stable aqueous dough conditioning compositions without the need to resort to use of an antioxidant. The principal stability problem with aqueous dough conditioners containing enzymes and ascorbic acid/sodium ascorbate is the denaturation of enzymes and the oxidation of ascorbic acid/sodium ascorbate owing to the presence of oxygen in the formulation water. We have found that this problem can be substantially overcome by the use of salt and sugar in the composition, without the need for additional antioxidant. It appears the effect may be to prevent oxygen remaining in the water during processing and subsequently, at least to any detrimental extent. We have found in this way compositions having excellent stability over at least three months, or up to six months or more, can be provided.

The aqueous dough conditioning composition may consist of only the aforementioned ingredients or comprise one or more further components if desired. For example, if necessary, one or more oxidants may be included. The presence or absence of further components will, generally speaking, depend upon what is required in the product (for example, a dough mix for bread) to which the composition is to be added.

In a related aspect, the invention also provides a process for preparing an aqueous dough conditioning composition in accordance with the invention, which process comprises mixing salt and sugar with water, and adding one or more enzymes. Optionally, further ingredients may be added to the water as necessary, depending upon the product requirements. An oxidant, if used, may be added before or after the enzymes.

In another aspect, the invention provides the use of salt and sugar to stabilise an aqueous dough conditioning composition comprising one or more enzymes, the composition being substantially free of antioxidant.

The invention also provides a dough comprising the dough conditioning composition as described herein.

Also encompassed by the invention is a baked product made from a dough comprising the dough conditioning composition of the invention.

A typical formulation, by way of illustration is:

| | |
|---|---|
| Flour | 100% |
| Salt | 2.0% |
| Yeast | 2.5% |
| Water | 62% |
| Control Dough Conditioner | 1% |
| Aqueous Dough Conditioner | 0.1-2.0% |

With respect to the enzyme, any suitable enzyme may be used as will be appreciated by those familiar with dough conditioning compositions, although preferred enzymes include one or more from lipases, galactolipases lipoxygenases, amylases, hemicellulases, maltogenic amylases, phospholipases, beta-glucanase, amyloglucosidases, glucose oxidase, hexose oxidase, laccase and transglutaminase. Lipases, galactolipases and phospholipases are particularly preferred. One enzyme only may be used, or combinations of two or more may be employed if desired.

The enzyme may be used in different forms. For example, the enzyme may be carried on an insoluble carrier such as wheat flour or a fraction from wheat flour, such that the enzyme is effectively held in suspension in the composition. In order to stabilise such a suspension and prevent settling, it is typically necessary to use a thickener such as a gum or similar. For example, Xanthan gum may be used. This serves to form a network in the composition which helps to keep the insoluble portion of the enzyme/carrier in suspension. Preferably, however, the or each enzyme is used in solution—that is, in a water-soluble form—without an insoluble carrier. For example, the enzyme may be added to the conditioning composition in the form of an aqueous solution of enzyme in water. Alternatively, the enzyme may be added in the form of a powder. Preferably, the powder is a spray dried powder, which can be obtained, for example, by spray drying the enzyme together with a water-soluble carrier. Suitable water-soluble carriers include maltodextrins and milk proteins. It is a particular advantage of the present invention that the dough conditioning composition may comprise one or more enzymes in solution, yet still possess adequate stability. The required enzymes can simply be added to the composition in the chosen form, and the mixture stirred thoroughly. A hydrocolloid such as Xanthan gum may be used if desired, although this is not always necessary when the enzymes are used in soluble form. High shear mixing can be used if necessary, when mixing the various ingredients of the composition.

Salt is preferably present in an amount of from 12% to 22% (by weight of the composition), and the sugar is preferably also present in an amount of 13%-23% (by weight of the composition) Sucrose and NaCl are preferred but alternatives may include glucose, fructose and KCl. These can all be used in the amounts indicated above.

The composition may optionally comprise an oxidant, and this is often preferable when the final product is a bread—that is, the composition is used to condition a bread dough mix. Any suitable oxidant may be used, although ascorbic acid is preferred. Other oxidants may be used instead of, or in addition to, ascorbic acid where the relevant food legislation permits. Alternatives include potassium bromate, potassium iodate, calcium peroxide, and azodicarbonamide, but this list is not exhaustive as will be clear to the skilled reader. It is particularly preferred to use a salt of an acid, particularly a salt of ascorbic acid, especially sodium ascorbate. We have found that the use of sodium ascorbate (or another suitable salt) substantially overcomes a problem which may be caused by using ascorbic acid—that of low pH, which may adversely affect the enzymes and cause premature deterioration. Whilst this problem has hitherto been addressed by neutralising with alkali, for example, sodium hydroxide (see, for instance WO 2004/105494), this adds an additional processing step. In contrast, the use of sodium ascorbate (or another suitable salt) circumvents the potential pH problem, and avoids the need for sodium hydroxide.

Accordingly, the invention also provides, in a preferred aspect, an aqueous dough conditioning composition comprising water, one or more enzymes, salt, sugar and an oxidant in salt form, particularly sodium ascorbate, characterised in that the composition is substantially free of antioxidant. Oxidant is used preferably in an amount of 1%-16% (by weight of composition) with a preferred range 2-6%.

The composition may comprise a water soluble alkali, preferably sodium hydroxide, although as noted above this is not necessarily essential. The composition may also comprise a hydrocolloid, an emulsifier (e.g. sodium stearoyl lactylate), a polysaccharide (e.g. starch), or other means for increasing the viscosity of the composition. The emulsifier should be of a food grade. The hydrocolloid may be Xanthan gum or a suitable equivalent. Said one or more enzymes may comprise lipase and the oxidant (i.e. oxidising agent), if present, may be ascorbic acid, but is preferably sodium ascorbate.

The water ideally comprises dissolved sugar and dissolved salt, which are preferably added first.

The pH of the composition is preferably approximately 3.0 to 8.0, more preferably 4.0 to 5.0, and most preferably about 4.5. This can be achieved using, for example, sodium ascorbate, or a mixture of ascorbic acid and sodium ascorbate. Sodium hydroxide may be used if necessary, although by appropriate formulation we have found it is possible to achieve the correct pH without the need for sodium hydroxide. Preferably, after the salt and sugar, one or more enzymes are added. Also, after said one or more enzymes are added, a hydrocolloid may be added if desired. An oxidant may be added before or after the enzymes.

An embodiment of the present invention will now be described.

A 0.25% aqueous solution of dough conditioner may be prepared in accordance with the present invention by first adding sugar and salt to water. The sugar and salt are dissolved in the water by stirring. The sugar and salt may each be added in the quantity of 12-23%. However, in trials, a solution has been used with 23 wt % sugar, 20 wt % salt and 57 wt % water.

Once the sugar and salt have been dissolved in the solution, sodium ascorbate may then be added and dissolved with stirring. The pH of the product will be approximately 5.0 when using sodium ascorbate. If ascorbic acid is used the pH of the solution can be adjusted to the value of 3.0 to 8.0 (preferably 4.0 to 5.0 and more preferably 4.5) by adding sodium hydroxide solution (or any other suitable food grade water soluble alkali). The required enzymes are then added and thoroughly stirred into the solution. Suitable enzymes are noted above. A hydrocolloid (for example, Xanthan gum) is then added and the solution is stirred until a smooth gel is formed. The solution is ideally mixed with a high shear mixer.

The resultant aqueous fluid may then be stored at or below room temperature for later use as a dough conditioner (bread improving composition). Aqueous conditioner according to the invention was used to make bread in accordance with FIG. 1. All products were found to be satisfactory.

We have found that the sugar and salt in the aqueous fluid serves to protect the enzymes adequately and provide sufficient stability, without the need to use an additional antioxidant. After the necessary dough improving enzymes are added, a hydrocolloid may be used to thicken the solution, and this can further reduce water activity and so contribute to the stability of the composition.

The present invention is not limited to the specific embodiment described above. Alternative arrangements will be apparent to a reader skilled in the art. For example, although ascorbic acid is widely used in dough conditioners and takes the role of an oxidant, other oxidants may be used where food additive legislation permits (for example, in the US). Alternatives to ascorbic acid include potassium bromate, potassium iodate, calcium peroxide, and azodicarbonamide. Also, where food additive legislation permits, alternative antioxidants to those indicated above may be used, for example, L-cysteine hydrochloride.

The following Examples illustrate the invention.

EXAMPLES 1-4

Formulations 1-4

| Ingredients | Standard Formulation 1 | Formulation 2 | Formulation 3 | Formulation 4 (Production Run) |
|---|---|---|---|---|
| Water | 50.037 | 50.218 | 50.117 | 49.205 |
| Fine Salt 60 | 17.609 | 17.609 | 17.609 | 17.254 |
| Caster Sugar | 20.229 | 20.229 | 20.229 | 19.721 |
| Xanthan Gum (Keltrol) | 0.600 | 0.518 | 0.600 | 1.400 |
| Sodium Metabisulphite | 0.100 | 0.000 | 0.020 | 0.000 |
| Amylase | 0.800 | 0.800 | 0.800 | 0.800 |
| Hemi Cellulase | 0.625 | 0.625 | 0.625 | 2.500 |
| Oxidant | 10.000 | 10.000 | 10.000 | 10.120 |
| Total | 100 | 100 | 100 | 100. |

Aqueous dough conditioning compositions were formulated according to the compositions given in the above table. All values are by % wt of the total composition. Formulation 1 is a control composition (not according to the invention) and contains 0.1% wt sodium metabisulphite (i.e. antioxidant). Formulations 2-4 illustrate the invention. Formulation 2 contains no antioxidant, whereas Formulation 3 contains a fifth (20%) of the control level used in Formulation 1. Formulation 4 is an example of a production run, and contains no antioxidant. All of the compositions of the invention (2-4) showed excellent stability.

The invention claimed is:

1. An aqueous dough conditioning composition which comprises water, one or more enzymes, salt in an amount of from 12% to 22% by weight of the composition, sugar in an amount of from 13% to 23% by weight of the composition, sodium ascorbate or a mixture of sodium ascorbate and ascorbic acid,
   wherein the composition is free of water-soluble antioxidants and sulphur containing antioxidants;
   the composition having a storage stability of at least about three months in a closed container, at atmospheric pressure, and at about room temperature or less, substantially without denaturation of the enzymes, and without oxidation of ascorbic acid/sodium ascorbate, despite any presence of oxygen in the formulation water.

2. A composition according to claim 1 wherein each enzyme is in water-soluble form.

3. A composition according to claim 1 wherein the composition further comprises a hydrocolloid.

4. A composition according to claim 3 wherein the hydrocolloid is a gum.

5. A composition according to claim 4 wherein the gum is xanthan gum.

6. A composition according to claim 1 wherein the sodium ascorbate or mixture of sodium ascorbate and ascorbic acid is present in an amount of 1% to 16% by weight of the composition.

7. A process for preparing an aqueous dough conditioning composition of claim 1, which process comprises mixing salt and sugar with water, and adding one or more enzymes, and sodium ascorbate or a mixture of sodium ascorbate and ascorbic acid, wherein the composition is free of water-soluble antioxidants and sulphur containing antioxidants.

8. Dough comprising an aqueous dough conditioning composition according to claim 1.

9. A baked product obtainable by baking a dough according to claim 8.

10. An aqueous dough conditioning composition which comprises water, one or more enzymes, salt in an amount of from 12% to 22% by weight of the composition, sugar in an amount of from 13% to 23% by weight of the composition, and sodium ascorbate or a mixture of sodium ascorbate and ascorbic acid present at about 2% to about 6%, by wt. %, of the aqueous dough conditioning composition;
   wherein the composition is free of water-soluble antioxidants and sulphur containing antioxidants;
   the composition having a storage stability of at least about three months in a closed container, at atmospheric pressure, and at about room temperature or less, substantially without denaturation of the enzymes, and without oxidation of ascorbic acid/sodium ascorbate, despite any presence of oxygen in the formulation water.

11. A composition according to claim 10 wherein each enzyme is in water-soluble form.

12. A composition according to claim 10 wherein the composition further comprises a hydrocolloid.

13. A composition according to claim 12 wherein the hydrocolloid is a gum.

14. A composition according to claim 13 wherein the gum is xanthan gum.

15. A process for preparing an aqueous dough conditioning composition according of claim 10, which process comprises mixing salt and sugar with water, and adding one or more enzymes, and sodium ascorbate or a mixture of sodium ascorbate and ascorbic acid, wherein the composition is free of water-soluble antioxidants and sulphur containing antioxidants.

16. Dough comprising an aqueous dough conditioning composition according to claim 10.

17. A baked product obtainable by baking a dough according to claim 16.

* * * * *